(12) United States Patent
Trossen (10) Patent No.: US 10,979,482 B2
(45) Date of Patent: Apr. 13, 2021

(54) METHODS AND SYSTEMS FOR ANCHORING HYPERTEXT TRANSFER PROTOCOL (HTTP) LEVEL SERVICES IN AN INFORMATION CENTRIC NETWORK (ICN)

(71) Applicant: IDAC HOLDINGS, INC., Wilmington, DE (US)

(72) Inventor: Dirk Trossen, London (GB)

(73) Assignee: IDAC HOLDINGS, INC., Wilmington, DE (US)

( * ) Notice: Subject to any disclaimer, the term of this patent is extended or adjusted under 35 U.S.C. 154(b) by 250 days.

(21) Appl. No.: 15/546,719

(22) PCT Filed: Jan. 29, 2016

(86) PCT No.: PCT/US2016/015713
§ 371 (c)(1),
(2) Date: Jul. 27, 2017

(87) PCT Pub. No.: WO2016/123516
PCT Pub. Date: Aug. 4, 2016

(65) Prior Publication Data
US 2018/0007116 A1     Jan. 4, 2018

Related U.S. Application Data

(60) Provisional application No. 62/110,210, filed on Jan. 30, 2015.

(51) Int. Cl.
*G06F 15/16* (2006.01)
*H04L 29/08* (2006.01)
(Continued)

(52) U.S. Cl.
CPC ............ *H04L 67/02* (2013.01); *G06F 16/955* (2019.01); *H04L 45/741* (2013.01);
(Continued)

(58) Field of Classification Search
CPC ... G06F 16/955; H04L 12/4633; H04L 67/02; H04L 2212/00; H04L 45/741; H04L 45/745
(Continued)

(56) References Cited

U.S. PATENT DOCUMENTS 8,559,434 B2   10/2013  Esteve Rosenberg et al.
9,847,994 B1 * 12/2017  Kelly ...................... H04L 67/06
(Continued)

FOREIGN PATENT DOCUMENTS

CN    104023049 A    9/2014
EP    2 611 111      7/2013
WO    2016/033487   3/2016

OTHER PUBLICATIONS

Al-Khalidi et al., "POINT: iP Over IcN—the betTer ip," Deliverable D4.1, Evaluation Plan and Initial Validation Report (Aug. 31, 2015).
(Continued)

*Primary Examiner* — Dustin Nguyen
*Assistant Examiner* — Hao H Nguyen
(74) *Attorney, Agent, or Firm* — Volpe Koenig (57) ABSTRACT

Methods and systems anchor hypertext transfer protocol (HTTP) level communication in an information-centric networking (ICN) network. Both content requests and responses to servers within the ICN network and to servers located outside the ICN network, in an IP network for example, are disclosed. Communication may be between two IP capable only devices at the HTTP level, one connected to an ICN network while the other one is connected either to an ICN or IP network. The disclosed namespace 200 enables IP based HTTP communication within the ICN network. An information-centric networking (ICN) network attachment point (NAP) or border gateway (BGW) may receive an HTTP request packet and encapsulate the received HTTP request packet. The ICN NAP/BGW may then forward the HTTP request packet towards the local ICN network servers. The HTTP request packet may be published to a named content identifier (CID) that may be determined through a hash function of a fully qualified domain name (FQDN). The ICN NAP may receive a HTTP response packet for a subscribed information item, which
(Continued)

may be included in a named rCID. The named rCID may be determined through a hash function of a uniform resource locator (URL). Instead of using the hash of a URL and an FQDN directly, a separate scope identifier, which may be a root identifier, may be chosen for HTTP-over-ICN communication for the overall ICN namespace. The scope identifier may include a particular structure for the ICN namespace being built up. Using a root identifier may allow for separating HTTP-over-ICN communication from other ICN communication, for example, for operational or migration reasons. Under the root scope identifier, there may be two sub-scope identifiers, a first sub-scope identifier (I) for communication within the ICN network and a second sub-scope identifier (O) for communication to IP addresses outside the ICN network. The ICN may be based on the PURSUIT publish-subscribe architecture or on the Named Data Networking (NDN) project and the like.

12 Claims, 8 Drawing Sheets

(51) Int. Cl.
*G06F 16/955* (2019.01)
*H04L 12/749* (2013.01)
*H04L 12/741* (2013.01)
*H04L 12/46* (2006.01)

(52) U.S. Cl.
CPC ........ *H04L 45/745* (2013.01); *H04L 12/4633* (2013.01); *H04L 2212/00* (2013.01)

(58) Field of Classification Search
USPC .............. 709/203, 204, 206, 217, 219, 232; 713/155, 168, 171
See application file for complete search history.

(56) References Cited

U.S. PATENT DOCUMENTS

| | | | |
|---|---|---|---|
| 2009/0319776 A1* | 12/2009 | Burch | H04L 63/08 713/155 |
| 2010/0235471 A1* | 9/2010 | Parikh | H04L 41/0893 709/219 |
| 2012/0016655 A1* | 1/2012 | Travieso | G06F 16/248 704/2 |
| 2012/0102124 A1* | 4/2012 | Hansson | G06Q 30/02 709/206 |
| 2013/0173822 A1* | 7/2013 | Hong | H04L 67/327 709/232 |
| 2014/0020102 A1* | 1/2014 | Srinivasan | H04L 63/10 726/23 |
| 2014/0201212 A1* | 7/2014 | Qi | H04L 67/303 707/741 |
| 2015/0006896 A1* | 1/2015 | Franck | H04L 63/04 713/171 |
| 2015/0381557 A1* | 12/2015 | Fan | H04L 61/303 709/245 |
| 2016/0330100 A1* | 11/2016 | Yu | H04L 45/02 |
| 2017/0237660 A1 | 8/2017 | Trossen et al. | |
| 2017/0277805 A1* | 9/2017 | Li | G06F 12/0615 |
| 2018/0227390 A1* | 8/2018 | Reznik | H04L 67/327 |
| 2019/0199540 A1* | 6/2019 | Robitzsch | H04L 12/189 |

OTHER PUBLICATIONS

Hoffman et al., "The DNS-Based Authentication of Named Entities (DANE) Transport Layer Security (TLS) Protocol: TLSA," Internet Engineering Task Force (IETF), RFC 6698 (Aug. 2012).

Jacobson et al., "Networking Named Content," CoNEXT Proceedings of the 5th Internet Conference on Emerging Networking Experiments and Technologies, Rome, Italy, pp. 1-12 (2009).

Jarmoc, "Transitive Trust: SSL/TLS Interception Proxies," (Mar. 21, 2012) *available at* https://www.secureworks.com/research/transitive-trust.

Jokela et al., "LIPSIN: Line Speed Publish/Subscribe Inter-Networking," ACM SIGCOMM Computer Communication Review, vol. 39, No. 4, pp. 195-206 (Aug. 2009).

Liang et al., "When HTTPS Meets CDN: A Case of Authentication in Delegated Service," IEEE Symposium on Security and Privacy (May 2014).

Trossen et al., "Designing and Realizing an Information-centric Internet," IEEE Communications Magazine, vol. 50, No. 7 (Jul. 2012).

Trossen et al., "Final Updated Architecture," Pursuit Publish Subscribe Internet Technology FP7-INFSO-ICT-257217, Deliverable D2.5 (Mar. 5, 2013).

Xylomenos et al., "A Survey of Information-Centric Networking Research," IEEE Communications Surveys and Tutorials, vol. 16, No. 2, pp. 1024-1049 (2014).

Xylomenos et al., "Socket Emulation over a Publish/Subscribe Network Architecture," Proceedings of the Future Network and Mobile Summit, pp. 1-5 (Jun. 2010).

* cited by examiner

METHODS AND SYSTEMS FOR ANCHORING HYPERTEXT TRANSFER PROTOCOL (HTTP) LEVEL SERVICES IN AN INFORMATION CENTRIC NETWORK (ICN)

CROSS REFERENCE TO RELATED APPLICATIONS

This application is the U.S. National Stage, under 35 U.S.C. § 371, of International Application No. PCT/US2016/015713 filed Jan. 29, 2016, which claims the benefit of U.S. provisional application No. 62/110,210 filed Jan. 30, 2015, the contents of which are hereby incorporated by reference herein.

BACKGROUND

Information-centric networks (ICNs) may constitute a new networking paradigm in which content is exchanged by means of information addressing. Different architectures may be used to realize ICNs, which may require the partial replacement of current network infrastructure and equipment, such as, for example, routers, gateways and the like, in order to realize the desired network-level functions of these solutions. ICNs may provide improvements to current networking, including, for example, better performance, multicast support, in-network caching, and the like.

Migration scenarios from current network architectures to ICNs foresee that the new architectures may be realized as an overlay over existing architectures, such as for example, Internet Protocol (IP) based or local Ethernet based architectures. Such migration, however, may still require the transition of the user equipment (UE) to an ICN-based solution. With IP-based applications currently providing a broad range of Internet services, transitioning all of these applications may easily be seen as a much harder task than the pure transition of the network-level functionality. Protocol stack implementation in the UE, for example, will require additional functionality in the ICN context. Server-side components, for example, e-shopping web-servers, content servers, and the like, will additionally require new functionality in the ICN context. Further, changes to UEs due to different network protocol stacks may be difficult to implement because upgrades to device operating systems (OS) may be needed. In addition, ICNs may require changes to applications which utilize IP-level abstraction, such as for example sockets to program distributed functionality. In addition to the difficulty of modifications applications, modifications to integrated development environments (IDEs), software development kits (SDKs) and the like may be also be required and difficult. Accordingly, one may assume that IP-based services, and with it purely IP-based UEs, will continue to exist for some time to come.

SUMMARY

Methods and systems anchor hypertext transfer protocol (HTTP) level communication in an information-centric networking (ICN) network. Both content requests and responses to servers within the ICN network and to servers located outside the ICN network, in an IP network for example, are disclosed. Communication may be between two IP capable only devices at the HTTP level, one connected to an ICN network while the other one is connected either to an ICN or IP network. The disclosed namespace enables IP based HTTP communication within the ICN network.

An information-centric networking (ICN) network attachment point (NAP) or border gateway (BGW) may receive an HTTP request packet and encapsulate the received HTTP request packet. The ICN NAP/BGW may then forward the HTTP request packet towards the local ICN network servers. The HTTP request packet may be published to a mutable content named information item, which may be included in a named content identifier (CID). The named CID may be determined through a hash function of a fully qualified domain name (FQDN).

The ICN NAP/BGW may receive a HTTP response packet for a subscribed information item, which may be included in a named rCID. The named rCID may be determined through a hash function of a uniform resource locator (URL).

BRIEF DESCRIPTION OF THE DRAWINGS

A more detailed understanding may be had from the following description, given by way of example in conjunction with the accompanying drawings wherein.

DETAILED DESCRIPTION

Figure 1A:
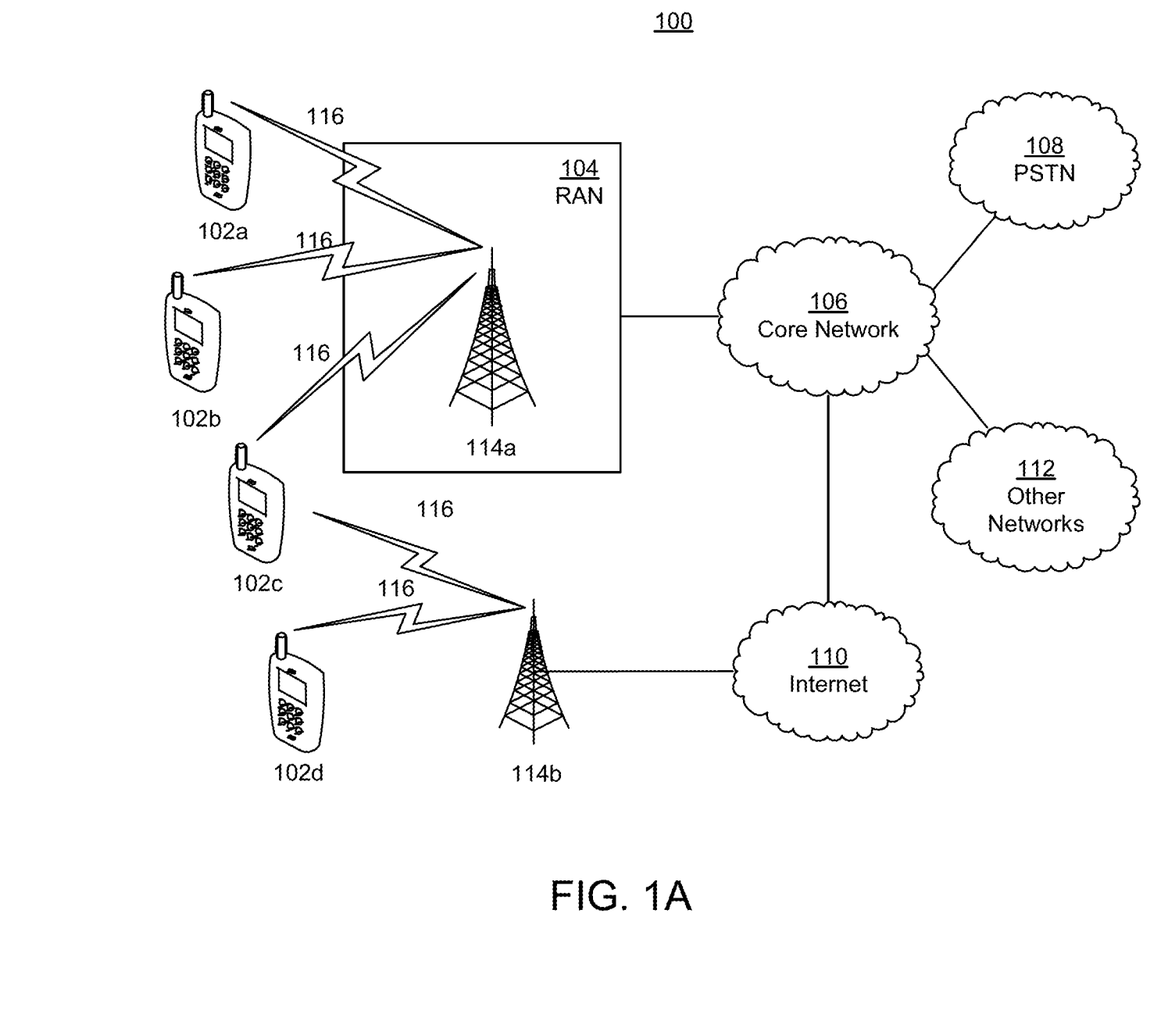
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
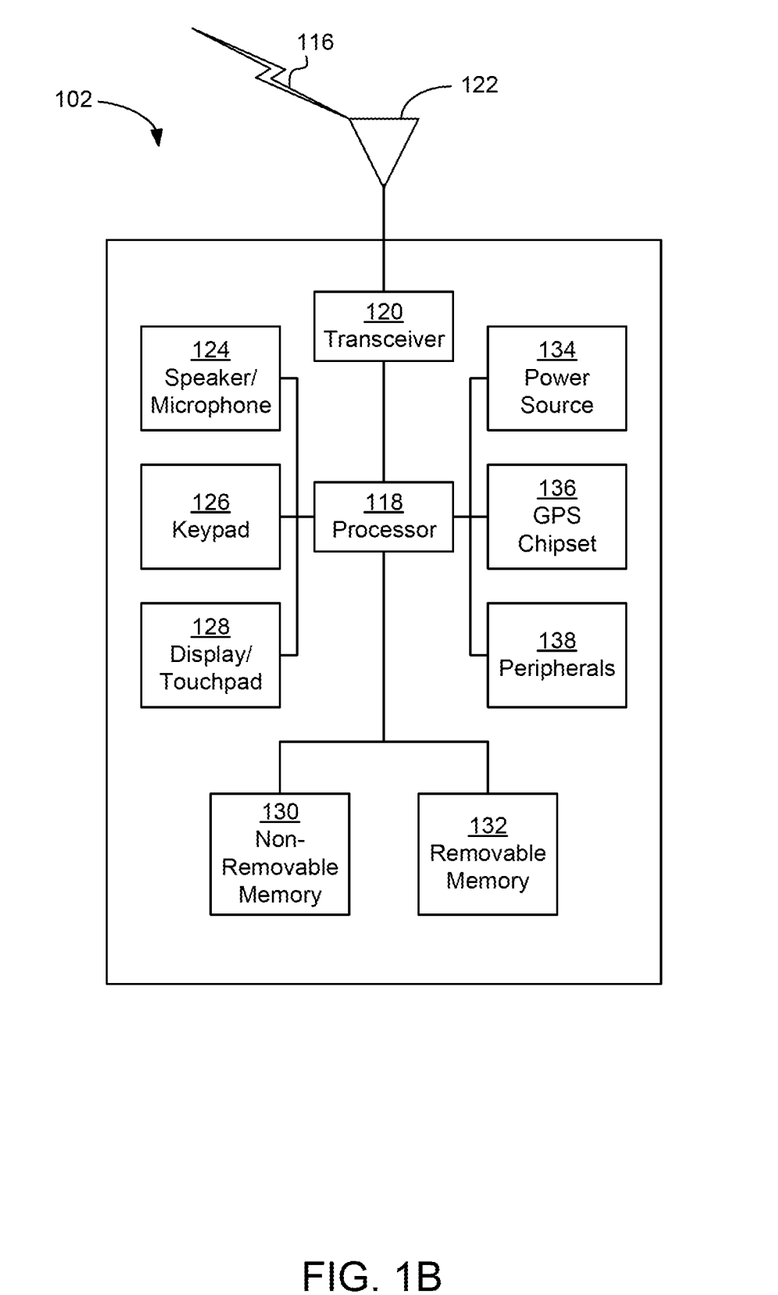
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
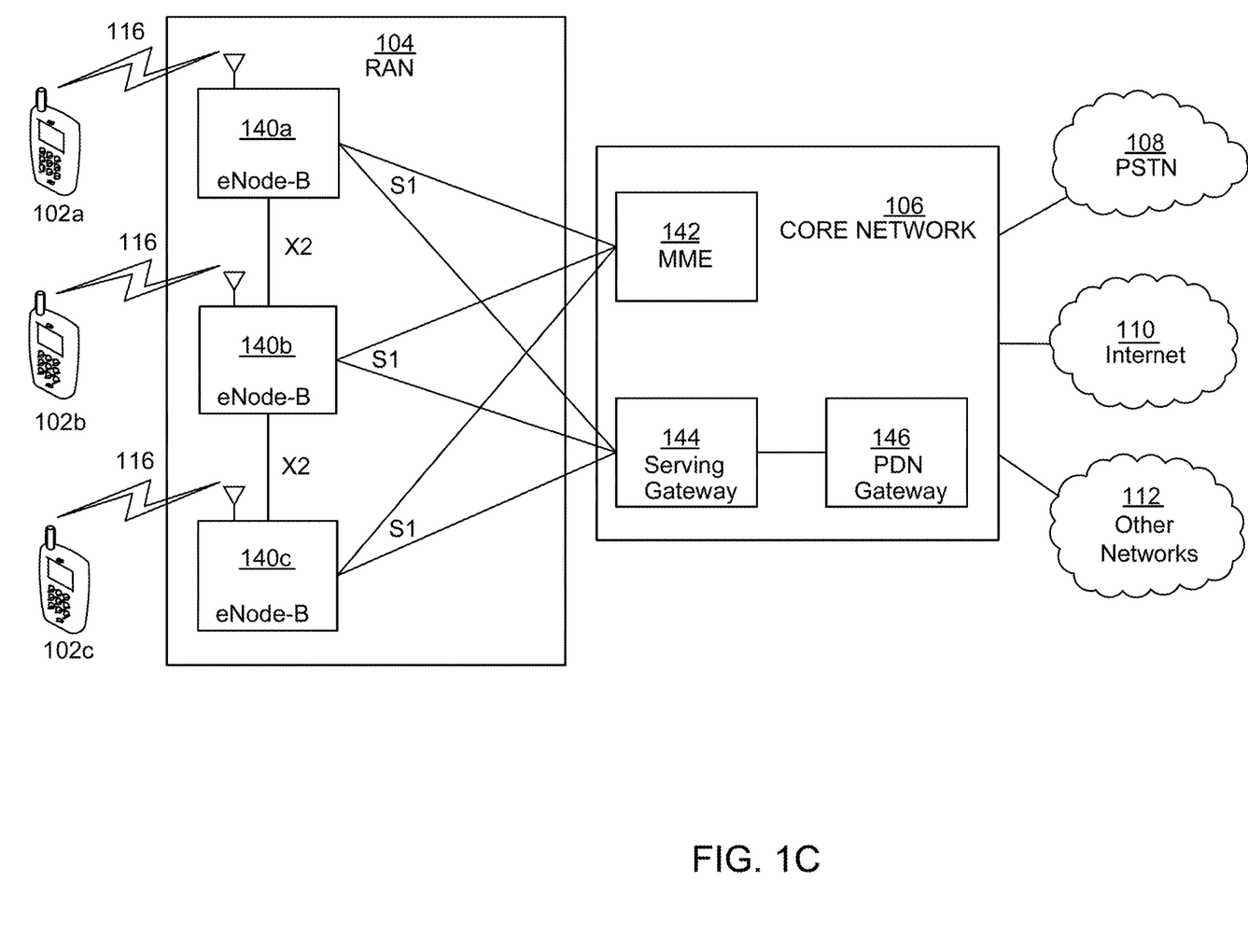
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The transition to information-centric networking at the network level may provide many improvements, such as increased efficiency through the usage of in-network caches and the spatial/temporal decoupling of the sender/receiver in general, and the utilization of (possibly ongoing) software-defined networking (SDN) upgrades for better flow management, to name only a few examples. As a result of the transition to information-centric networking and utilization of ICNs, the ability to run IP applications over an ICN without any changes to the UE may be desirable. Further, it may be desirable to run IP applications over an ICN network either within a single ICN network, or from and to an ICN network to and from another IP network.

As disclosed herein, examples show the transition of IP based networks towards an information-centric mode of operation in an ICN, while realizing the communication of IP-based services and applications in such an environment. Examples disclosed herein describe this combination and a system in which IP-based devices may communicate with each other while being attached to an ICN. This communication may take place either with another IP device which may be connected to the ICN, or with an IP device connected to a standard IP based network. The protocol being utilized in example communications disclosed herein may be hypertext transfer protocol (HTTP), the most common protocol for web service exchange in the Internet, but the present disclosure is not limited to only HTTP.

Examples disclosed herein include procedures, methods, and architectures for anchoring HTTP-level communication in an ICN or across an IP peer network for retrieving content located either solely within an ICN or located outside an ICN or accessed from outside an ICN. Further examples disclosed herein include systems, methods and procedures to enable the communication between two IP-only devices at the HTTP level, one of the IP-only devices connected to an ICN while the other IP-only device is connected either to an ICN or an IP network. More specifically, examples disclosed herein include methods and procedures for an ICN network attachment point (NAP) which may forward HTTP requests and responses originating from an IP-only device via an ICN. Further, examples disclosed herein include methods and procedures for an ICN NAP that forwards HTTP requests and responses towards an IP-only device (connected via another ICN NAP), the requests and responses received via the ICN. Further, examples disclosed herein include methods and procedures for an ICN border gateway (BGW) which may forward HTTP requests and responses originating from an IP-only device and received via an ICN towards another IP network. Further, examples disclosed herein include methods and procedures for an ICN BGW which may forward HTTP requests and responses towards an IP-only device via an ICN, the requests received via an IP network.

In examples disclosed herein, the NAP may provide a standard IP network interface towards the IP-enabled device and encapsulate any received HTTP request into an appropriate ICN packet, which is then published to the ICN as an appropriately formed named information item. Conversely, the NAP may subscribe to any appropriately formed named information items, where the information identifier represents any HTTP-exposed service that is exposed at any IP-level device locally connected to the NAP. Any received ICN packet may then be forwarded to the appropriate local IP device after being appropriately decapsulated, after recovering the original HTTP request. Additionally, examples disclosed herein also include the operation of an ICN BGW, which may receive ICN packets from NAPs in its network that are destined to an HTTP-level service outside of its network and forward these packets towards the appropriate IP networks. Conversely, any HTTP request received at the BGW may be forwarded to the appropriate IP-based device in its local ICN.

Further, examples disclosed herein include an HTTP-level content exchange which may be interpreted as a named entity for a channel being established between one IP device requesting the content and another that serves the requested content. More specifically, the communication for retrieving a given uniform resource locator (URL) from a server with a fully qualified domain name (FQDN) that is part of such URL may be interpreted as sending data (via a channel) to an information item named content identifier (CID). The information item named CID may be determined by hashing the FQDN. In other words, the NAP to which a specific IP-based client wanting to retrieve a content named URL is connected, may publish the HTTP packets of the IP-based clients to the information item, while the NAP to which the device exposing a service under the given FQDN may subscribe to the information item. The response to any HTTP-level communication may be sent by the NAP to which the server is connected towards the information item named response CID (rCID), which may be determined through hashing the URL, as described further herein, to which the NAP to which the client is connected in turn may subscribe.

Persons having ordinary skill in the art understand that the NAP to which the device exposing a given FQDN is connected may be able to subscribe to the CID, since various ICN flavors may provide various access control mechanisms to ensure such restriction. Examples disclosed herein allow for communication of IP-only devices within and across an ICN. Examples disclosed herein rely on fundamental assumptions regarding the semantics of the service model as well as the information items provided by the ICN architectures. Specifically, examples disclosed herein assume a push-based service model, for example, a publish-subscribe model, being exposed as well as the support for mutable information items, i.e., where a publisher is able to republish different content under an already published ICN name. Such assumptions may be supported, for instance, by the PURSUIT architecture. Supporting named data networking (NDN) like architectures, for example, pull-based service semantics over immutable information items, may also be considered.

As disclosed herein, an IP-based server may be reachable via a FQDN. Further, as disclosed herein, the exchange of information pertaining to a name URL may be interpreted as an ICN-based communication from an IP-based client towards an IP-based server pertaining to an appropriate ICN name CID that may be determined through a hash of the FQDN. The communication may follow a channel semantic in the sense that the HTTP packets sent via this channel (defined through the appropriate ICN name) may be mutable information items at the ICN level. The ICN-level content may be mutable because the same name is used for the mutable content that is defined by the HTTP packets pertaining to the session represented by this FQDN. In an example above, this may mean that HTTP packets are actually published to a mutable content named CID. Furthermore, any content residing outside the ICN network may be accordingly encoded as an appropriate ICN name through wildcard URLs.

With HTTP responses to information requests (the latter being sent as information packets to the name CID), any response of the server to the information request received having name CID may be published by the server as an information item named rCID (which may be determined as hash(URL)). The NAP to which the IP-based client is connected may subscribe to the information item named rCID and may therefore receive any HTTP response for the information exchange pertaining to the HTTP-level communication towards the URL.

Figure 2:
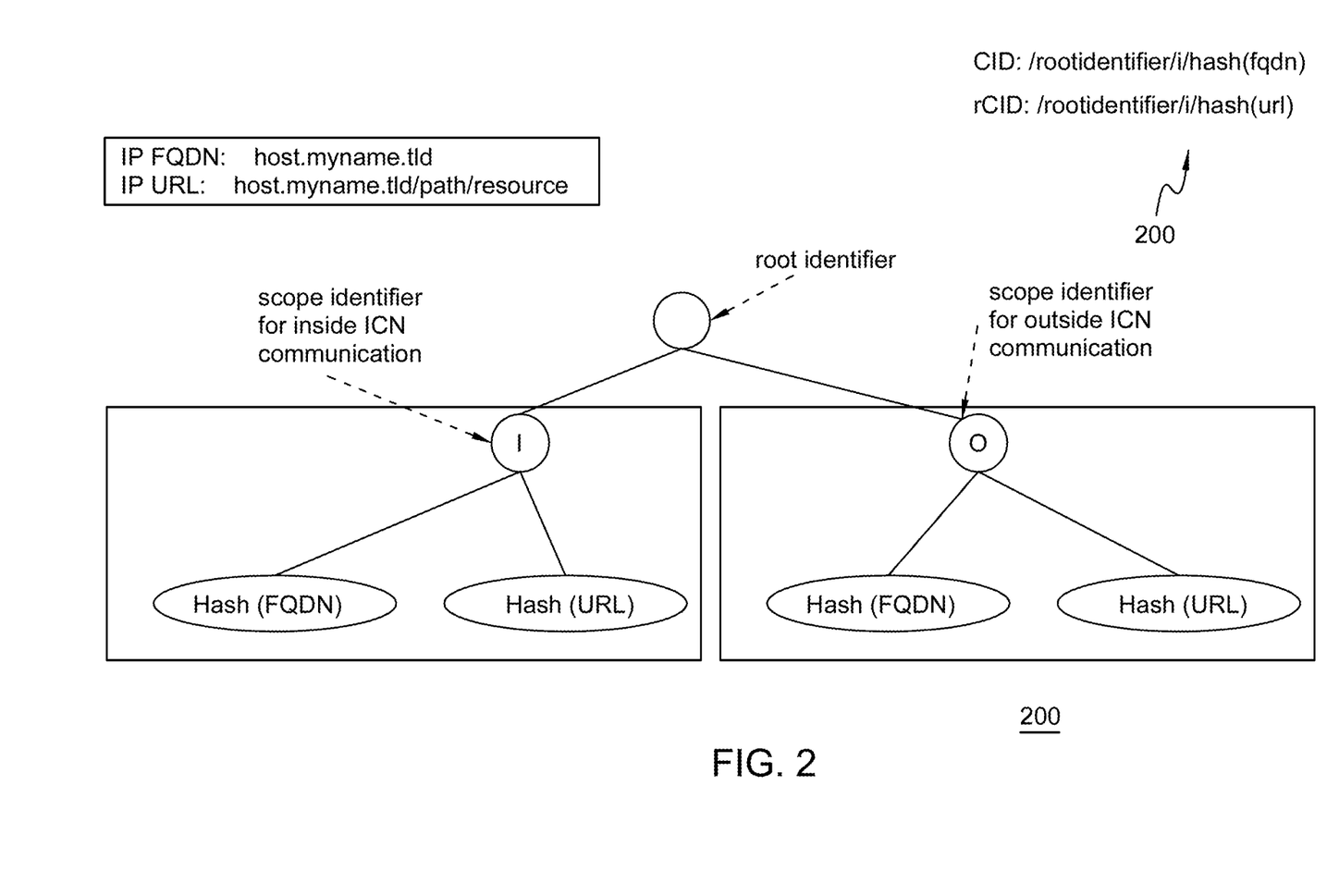
FIG. 2 is a diagram of an example of an appropriate information-centric networking (ICN) name space.

FIG. 2 is a diagram of an example of an appropriate information-centric networking (ICN) namespace 200. In an example, instead of using the hash of a URL and an FQDN directly, a separate scope identifier, which may be a root identifier, may be chosen for HTTP-over-ICN communication for the overall ICN namespace. The scope identifier may include a particular structure for the ICN namespace being built up, as shown in the embodiment of FIG. 2. Using a root identifier may allow for separating HTTP-over-ICN communication from other ICN communication, for example, for operational or migration reasons. Such a root identifier may be standardized, agreed upon in an appropriate forum, or simply defined in a proprietary manner across ICNs of a certain vendor or operator or both.

Continuing to refer to FIG. 2, under the root scope identifier, there may be two sub-scope identifiers, a first sub-scope identifier for communication within the ICN network (denoted as I in FIG. 2) and a second sub-scope identifier for communication to IP addresses outside the ICN network (denoted O in FIG. 2). Under each of these sub-scope identifiers, a hashed URL and a hashed FQDN may be published. In the case of PURSUIT, for example, this function may be a hash function providing a 256 bit output (the PURSUIT identifier length) for each CID and rCID. Any such hash function may need to comply with the requirements of the ICN architecture, for example, to produce statistically unique identifiers. FIG. 2 shows an exemplary embodiment of the ICN namespace, according to examples above, which may include a single root identifier for the HTTP over ICN communication, the two sub-scope identifiers for the within ICN and outside ICN communication, and the flat namespace of CID and rCID identifiers under each of these sub-scopes. For example, for content inside the ICN according to the described namespace, a CID may be /rootidentifier/I/hash(FQDN) and an rCID may be /rootidentifier/I/hash(URL), 210.

Architectures such as NDN may use standard DNS names as ICN content identifiers as well as rely on a pull-based service model for retrieving ICN packets. Other examples may support such ICN architectures.

In a further example, the ICN names may be constrained with additional information. The usage of URLs, or in a more general form uniform resource identifiers (URIs), may allow for additionally constraining HTTP information through, for example, specific queries, parameters (to such queries) and other possible constraints. Such constraints may be, due to their inclusion in the URL, included into the rCID (via the hashing of the URL) that is used to communicate the results back from the server to the client. The constraints themselves may be part of the URL within the originating request that is being published to the CID and can therefore be extracted by the server upon reception of the incoming HTTP request.

In an example, an entity may indicate interest in an appropriate ICN name. A publish-subscribe model may be the underlying semantic for the ICN network. For example, ICN information items may be published by a first ICN entity and retrieved by subscribing to the first ICN entity at another ICN entity. The interest indication may be removed from the ICN network by unsubscribing from the ICN name.

In an example, an entity may indicate interest in an entire sub-part of the namespace, including the HTTP namespace. Architectures may provide an interest indication in entire sets of information items by subscribing to the next level hierarchy in an appropriate ICN name. Examples disclosed herein may utilize this capability for indicating an interest into all HTTP-level communication between IP devices within the ICN by subscribing to /rootidentifier/I. Conversely, communication to any IP device outside the ICN may be indicated by subscribing to/rootidentifier/O. This capability may be later utilized for realizing communication towards content servers outside the ICN.

HTTP packets may be encapsulated in ICN packets. The ICN packets may assume a very generic ICN packet format, comprising the ICN name, a possible options header and the payload. Accordingly, the encapsulation of IP packets may insert the appropriate ICN name (determined according to the methods described herein as well as any constraining information that is added to the communication, as also described herein) into the appropriate packet header, set any appropriate options in the options header and then copy the entirety of the HTTP packet into the payload of the ICN packet. In a further example, an ICN packet may be fragmented into multiple smaller chunks and this operation may be transparent to the encapsulation of the HTTP packet.

Figure 3:
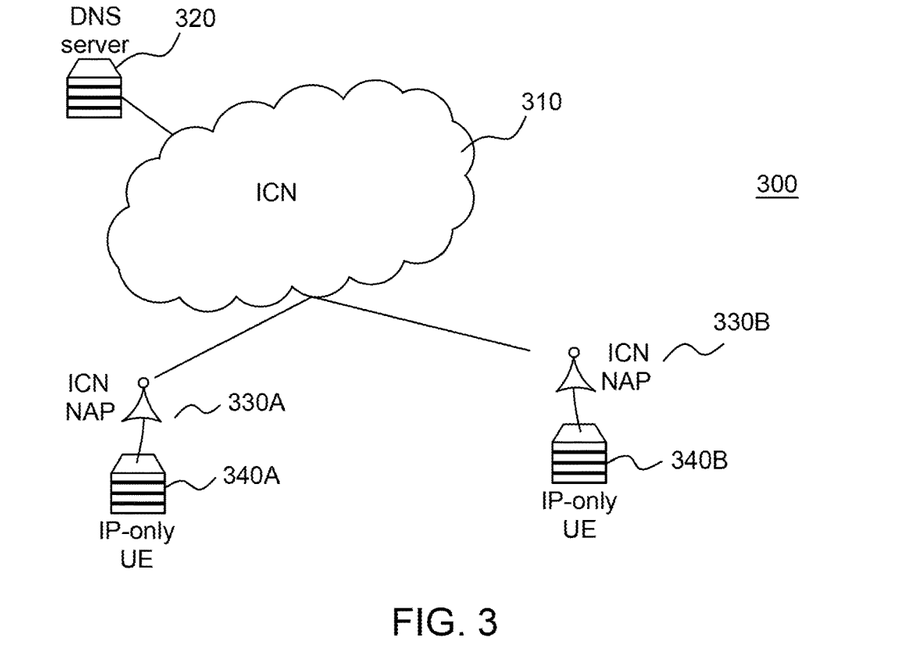
FIG. 3 is a system diagram of example system components for communication within an ICN.

FIG. 3 is a system diagram 300 of example system components for communication within an ICN network 310. A domain name system (DNS) server 320 is in communication with the ICN network 310. Within the ICN network 310, an ICN NAP 330 is in communication with an IP-only UE 340. The ICN NAP 330 may include logic for implementing the ICN namespace described above. The DNS server 320 may act as the local DNS authority for FQDN registrations within the ICN network 310.

Figure 4:
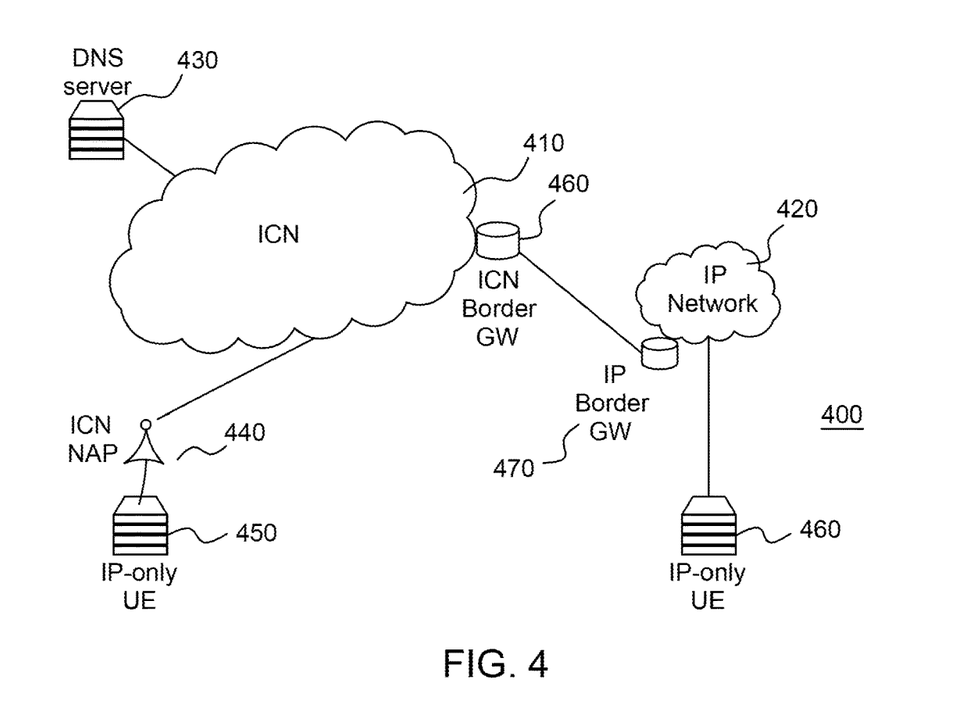
FIG. 4 is a system diagram of example system components for communication from, and to, an ICN and an Internet Protocol (IP) based network.

FIG. 4 is a system diagram 400 of example system components for communication from and to an ICN network 410 and an IP network 420. A domain name system (DNS) server 430 is in communication with the ICN network 410. Within the ICN network 410, an ICN NAP 440 is in communication with a first IP-only UE 450. The ICN NAP 440 may include logic for implementing the ICN namespace described above. The DNS server 430 may act as the local DNS authority for FQDN registrations within the ICN network 410. The ICN network 410 is in communication with the IP network 420 via an ICN border gateway (BGW) 460, which is positioned at the border of the ICN network 410, and an IP BGW 470, which is positioned at the border of the IP network 420. A second IP-only UE 460 is attached (by way of a generic IP access, not shown) to the IP network 420.

Figure 5:
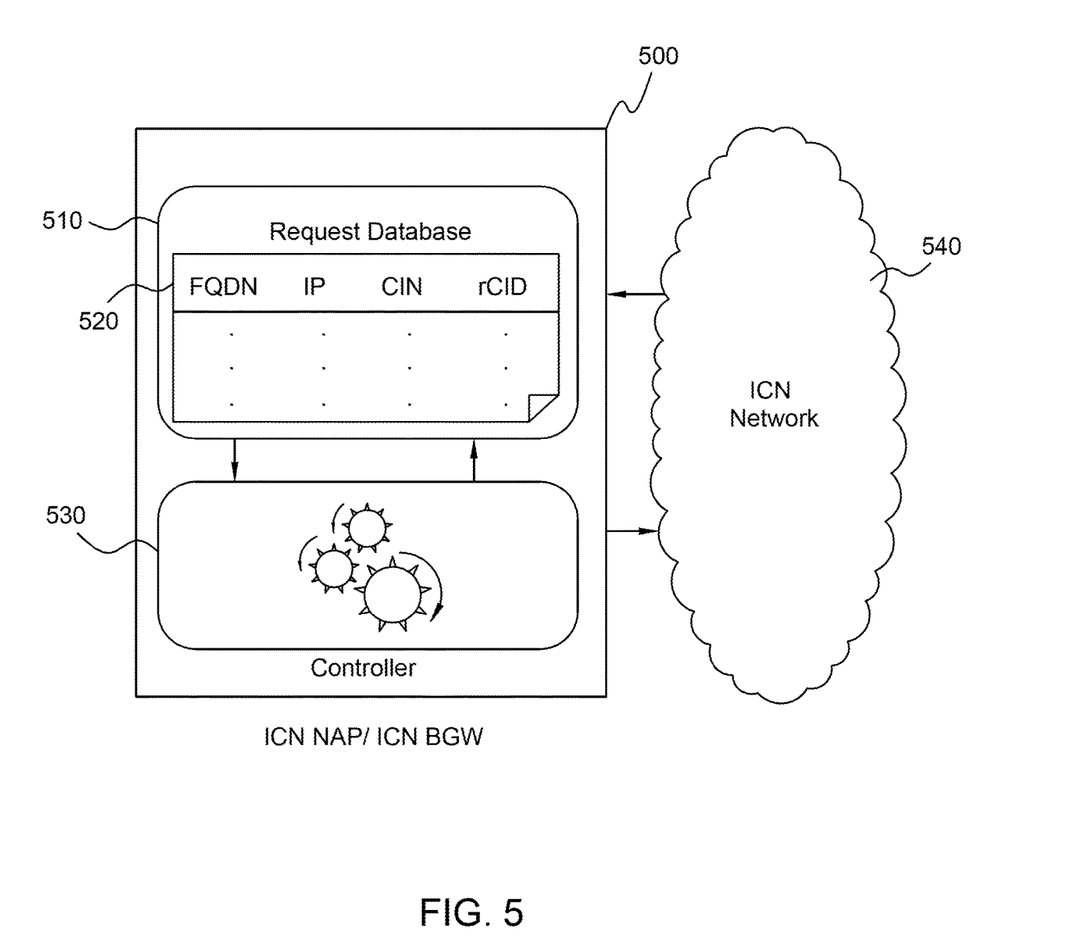
FIG. 5 is a diagram of an example of an ICN network attachment point (NAP) and ICN border gateway (BGW)

FIG. 5 is a block diagram of both an ICN NAP and an ICN BGW 500. The ICN NAP/ICN BGW 500 may be the ICN NAP 330 of FIG. 3, the ICN NAP 440 of FIG. 4, or the ICN BGW 460 of FIG. 4. The ICN NAP/ICN BGW 500 includes a storage 510 that may store a request database 520. The structure of the request database includes, at least, an FQDN of servers being contacted (including locally attached servers), an IP address of the devices from which these requests originated, a corresponding CID and rCID for the request or response. The ICN NAP/ICN BGW 500 may further include a controller 530 that receives requests, interfaces with the request DB 520, and generates responses, as appropriate. The ICN NAP/ICN BGW 500 may generally act as a router towards an IP-based UE (in the case of the ICN NAP) or the outside IP networks (in the case of the ICN BGW). The ICN NAP/ICN BGW 500 is in communication with an ICN network 540, from which it receives requests and publishes responses.

In an example, a first IP-only UE may execute any standard IP-enabled application and service (by sending and receiving IP packets at its network interface) in collaboration with a second IP-only UE. The second IP-only UE may be located either in an ICN network, as shown by IP-only UE 340 in FIG. 3, or in an IP-based network, as shown by IP-only UE 460 in FIG. 4.

Referring to the ICN NAP/ICN BGW 500 of FIG. 5, the operations of this node may include, but may not be limited to, name lookup, encapsulation, sending and receiving, and request-response semantics of HTTP. The controller 530 may perform these operations.

In one example, HTTP servers located within the ICN may be registered at the ICN NAP/ICN BGW 500. With reference to the architecture of FIG. 3, IP-only UE 340A (the client in this scenario) may desire to access content on IP-only UE 340B (the server in this scenario) located within the same ICN network 310. The content of the server IP-only UE 340B may be exposed at the ICN NAP 330B to which the server IP-only UE 340B is connected. For this, the controller 530 of the ICN NAP 330B may forward the DNS registration messages from the server IP-only UE 340B to the DNS server 320 of the local ICN network 310, which may act as an authoritative DNS server for all registrations within the local ICN network 310.

Continuing to reference FIG. 3, upon receiving a DNS registration message, the DNS server 320 may interact with the global DNS according to standard methods, exposing any ICN-local content to the rest of the Internet. Additionally, the DNS server 320 may publish a current list of FQDN registrations and IP addresses under a well-known ICN name, DNSlocal. All ICN NAPs 330A, 330B within the local ICN network 310 may have subscribed to this ICN name and may receive an updated FQDN-IP mapping. In the context of the ICN network 410 of FIG. 4, in addition to ICN NAP 440, the ICN BGW 460, if subscribed to this ICN name, would receive an updated FQDN-IP mapping.

With reference to FIG. 5, upon receiving such an updated mapping, each ICN NAP/ICN BGW 500 may perform the following operations. For each FQDN in the updated mapping, a request database 520 row with a matching FQDN column is located. If the FQDN is found in the request database 520, the ICN NAP/ICN BGW 500 may replace the IP address of the corresponding IP column with that of the updated mapping. If the FQDN is not found in the request database 5520, the ICN NAP/ICN BGW 500 may insert a new row with the FQDN and IP entries from the updated mapping and create an appropriate CID, such as /rootidentifier/I/hash(FQDN), to be inserted into the appropriate column of the new row. Furthermore, the NAP to which the server is actually attached (checked through IP subnet matching), may also subscribe to the CID towards the local ICN network. The controller 530 of the ICN NAP/ICN BGW 500 may control the processing of the updated mapping in accordance with the above description.

The above described update operation may ensure that all requests towards a server (such as the IP-only UE 340B) are sent to the updated IP address, all NAPs and ICN BGWs are aware of any servers located in their ICN network and the ICN NAP to which the server is attached is properly subscribed to any request sent to this server. This ensures that the server (and therefore its content) within the local ICN network is reachable.

With reference to FIG. 4, in an example, HTTP servers located outside of the ICN network 410, in the IP network 420, may be registered at the ICN BGW 460. All content located outside the ICN network 410 may be handled through the ICN BGW 460. For receiving any ICN-local requests for non-local servers, the ICN BGW 460 may utilize the namespace definition described above with reference to FIG. 2 by subscribing to the /rootidentifier/O/ scope. The ICN BGW 460 may therefore receive any publications (from a local IP client) towards any Internet-wide servers. These ICN requests may carry an appropriate ICN name of /rootidentifier/O/hash(FQDN), independent from the exact name of the server, for example, the FQDN.

In one example, with reference to FIGS. 3 and 5, a request may be sent from within the ICN network 310. At the client IP-only UE 340A side, the controller at the ICN NAP 330A may act as a web proxy towards the client IP-only UE 340A, terminating the HTTP session at the HTTP level. Upon receiving any HTTP-level requests, the controller of ICN NAP 330A may use the request database to determine whether the content is local by finding the appropriate row with an FQDN and valid IP entry. If such an entry is found, the ICN NAP 330A may create an appropriate ICN name for the request, named CID, as /rootidentifier/I/hash(FQDN) and for the response, named rCID, as /rootidentifier/I/hash(URL). Further, the URL and FQDN may be extracted from the HTTP request. If such an entry is not found, and the content is therefore determined to be external to the ICN network 310, the ICN NAP 330A may create an appropriate name for the request and response as /rootidentifier/O/hash(FQDN) and /rootidentifier/O/hash(URL). The ICN NAP 330A may then encapsulate the request according to the methods as described herein, and publish the ICN information item towards the local ICN network 310. Furthermore, the ICN NAP 330A may subscribe to the information item named rCID.

In the case where the server is local to the ICN NAP, the ICN NAP at which the server is registered may receive the publication. This may be ensured by the procedures disclosed herein. The ICN NAP may then extract the IP address of the local server from the corresponding request database entry for the CID, decapsulate the HTTP request from the ICN packet, and forward the HTTP request to the locally attached IP address.

With reference to FIG. 4 and FIG. 5, in the case where the server is located outside of the ICN network 410, for example the server is located in the IP network 420, the procedures disclosed herein may ensure that the publication to /rootidentifier/O/hash(FQDN) (with FQDN being the server name of the externally located server) will be received at the ICN BGW 460. Upon receiving any such publication, the ICN BGW 460 may create an appropriate entry in its request database 520, with the FQDN of the server as well as the corresponding CID and rCID, both determined with the help of the HTTP request. ICN BGW 460 may then decapsulate the received request, and forward the HTTP request, acting as a web proxy towards the standard IP Internet.

Continuing to refer to FIG. 4 and FIG. 5, in an example, a request may be sent from outside of the local ICN network 410. The procedures disclosed herein may ensure that all local servers are properly registered with the DNS server 430 and therefore visible as Internet-wide content sources. Any HTTP request being sent to any ICN-local server may be received at the controller 530 of the ICN BGW 460 which may act as a standard router, for example, a border gateway protocol (BGP) router, exposing the assigned IP addresses of the local ICN network 410 to the wider IP-based Internet.

Upon receiving such an HTTP request for local ICN network 410 servers, the ICN BGW 460 may insert an entry into its request database 520 with the appropriate CID (such as /rootidentifier/I/hash(FQDN)) and rCID (such as /rootidentifier/I/hash(URL)) as well as the FQDN and IP address of the server, according to its DNS entries, received according to the procedures disclosed herein. The ICN BGW 460 may then encapsulate the request and publish it as information item CID. The ICN BGW 460 may furthermore subscribe to the rCID, as determined before, ensuring that any response will be received.

Referring to FIG. 3 and FIG. 5, in an example, responses may be received by an ICN NAPs 330A, 330B from servers within the local ICN network 310. In the case of responses sent from servers in the local ICN network 310, the local ICN NAPs 330A, 330B may receive these responses. The local ICN NAPs 330A, 330B may then determine the appropriate ICN name for the response, for example, rCID, by consulting its request database 520. If the CID lies within the scope /rootidentifier/I/, it may create rCID as /root/I/hash(URL) (the URL being extracted from the HTTP request). If the CID lies within the scope /rootidentifier/O/, it may create rCID as /root/O/hash(URL). The ICN NAP 330A, 330B may then publish the encapsulated response, as with the encapsulation disclosed herein, to rCID.

If the rCID is /root/I/hash(URL), the corresponding ICN NAP 330A, 330B may receive the response, according to the subscription to rCID, as outlined herein, and decapsulate the response. The ICN NAP 330A, 330B may also forward the HTTP response in proxy mode to the IP address, for example, the client UE that sent the request, of the corresponding request database 520 entry for the rCID that can be found in the request database 520.

If the rCID is /rootidentifier/O/hash(URL), referring to FIG. 4 and FIG. 5, the rCID may be received at the ICN BGW 460, due to the subscription to rCID, as outlined herein, which may then decapsulate the rCID. The ICN BGW 460 may then forward the HTTP response in proxy mode to the IP address of the corresponding request database 520 entry IP associated with the rCID row.

In another example, with continued reference to FIG. 4 and FIG. 5, responses may be received from servers outside of the local ICN network 410, for example, from the IP network 420. Any HTTP response from an Internet server may arrive at the ICN BGW 460, acting as a standard gateway towards the Internet. The controller 530 of the ICN BGW 460 may extract the URL of the request and determine an appropriate ICN name for the response rCID as /rootidentifier/I/hash(URL). It may then encapsulate the HTTP packet as an ICN packet and publish the resulting ICN packet to the local ICN network 410 under the rCID name. As ensured by the procedures disclosed herein, an ICN NAP 440 associated with the requesting client, in this case IP-only UE 450, may receive the publication, consult its own request database 520 for finding the appropriate IP address of the local IP-only UE 450, decapsulate the HTTP packet and forward the packet in proxy mode to the locally attached IP-only UE 450.

In one embodiment, with reference to FIG. 5, the ICN NAP controller 530 and storage element 510 are provided in addition to a standard ICN NAP 500 in the form of a software add-on. Depending on the software platform used for the ICN NAP 500, this add-on could be provided through a downloadable software module, or it could be provided through a Network Function Virtualization (NFV).

In another embodiment, the storage element 510 and request database 520, may be realized in an operator-based central storage element (not shown). Such centralization may, for instance, be realized for manageability reasons for the IP-ICN name mapping. In this case, the ICN NAP controller 530 may utilize remote connectivity to the central storage element to perform the HTTP-ICN name mapping. In this way, the mapping of the endpoint to the ICN name may be done in the central storage element. In a further example, the central storage element may be a cloud based storage element.

Figure 6:
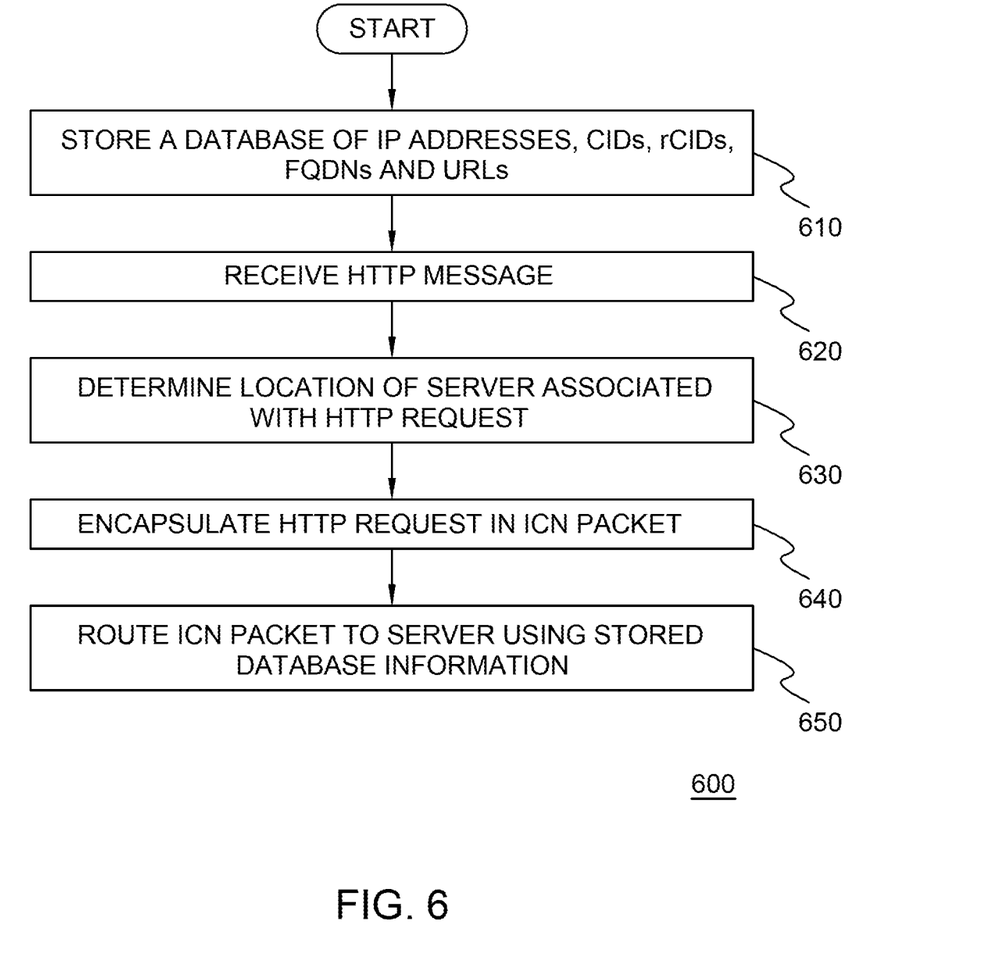
FIG. 6 is a method flow diagram of a method implemented in an ICN NAP/BGW for requesting HTTP over ICN content.

Referring now to FIG. 6, a method 600 for use in the ICN NAP/BGW is described. The ICN NAP/BGW stores a database of IP address, CIDs, rCIDs, FQDNs, and URLs, as described above (step 610). The ICN NAP/BGW receives an HTTP request message from an IP only UE (step 620). The ICN NAP/BGW determines a location of a server associated with the HTTP request message (step 630). This may be done in connection with a DNS server as described above. The ICN NAP/BGW encapsulates the HTTP request message in an ICN packet (step 640). The ICN NAP/BGW routes the ICN packet to the server using the stored database information (step 650). The operation of the ICN NAP/BGW in this method 600 is in accordance with the methods and procedures described above.

Figure 7:
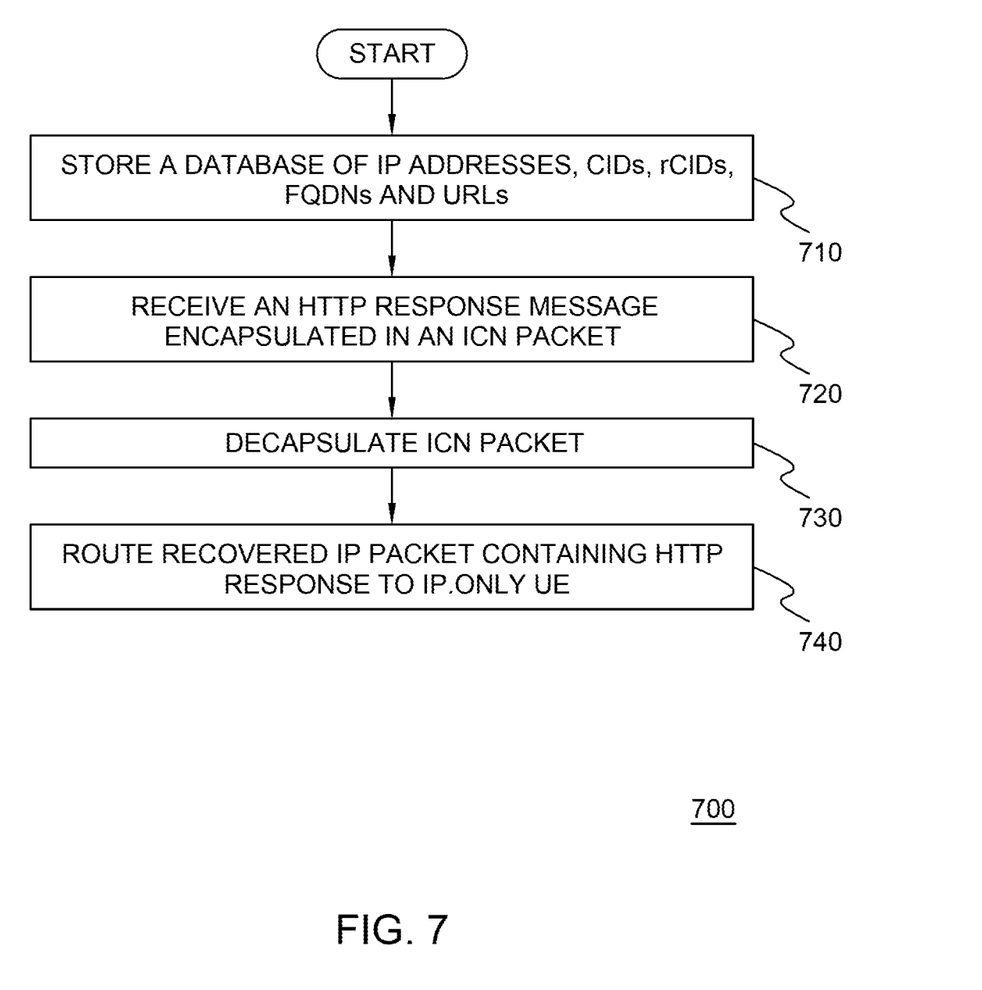
FIG. 7 is a method flow diagram of a method implemented in an ICN NAP/BGW for receiving HTTP over ICN content.

Referring to FIG. 7, a method 700 for use in the ICN NAP.BGW is described. The ICN NAP/BGW stores a database of IP addresses CIDs, rCIDs, FQDNs, and URLs, as described above (step 710). The ICN NAP.BGW receives an HTTP response message that is encapsulated in an ICN packet (step 720). The HTTP response message may be a response to the HTTP request described above with reference to FIG. 6. The ICN NAP/BGW decapsulate the ICN packet to recover the HTTP response message (step 730). The ICN NAP/BGW routes the recovered IP packet (i.e. the HTTP response message) to the IP only UE (step 740).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An information centric networking (ICN) network attachment point (NAP) comprising:
    a processor;
    a storage configured to store a database comprising a plurality of entries, the plurality of entries including a fully qualified domain name (FQDN), an Internet protocol (IP) address, a content identifier (CID), and a response CID (rCID);
    a controller configured to receive a HTTP request message from a not ICN capable user equipment (UE), and to encapsulate the HTTP request message in an ICN packet and publish the ICN packet to a CID based on a hash product of the stored FQDN associated with the HTTP request; and
    the controller further configured to subscribe to a rCID associated with the HTTP request message, and to receive and route ICN packets associated with the rCID to the not ICN capable UE.

2. The ICN NAP of claim 1, wherein the controller is further configured to subscribe to a response CID that is a hash of a uniform resource locator (URL) associated with content requested by the HTTP request message, and to receive an ICN packet associated with the response CID.

3. The ICN NAP of claim 1, wherein the NAP is a border gateway (BGW) interfacing the ICN network and an IP network.

4. The ICN NAP of claim 1, wherein the database includes, for each IP address, a corresponding CID and a corresponding fully qualified domain name (FQDN).

5. The ICN NAP of claim 1, wherein the database includes, for each IP address, a corresponding CID and a corresponding response CID (rCID).

6. The ICN NAP of claim 1, wherein a portion of the CID is a hash of a fully qualified domain name (FQDN) of the server associated with content identified by the CID.

7. The ICN NAP of claim 1, wherein the CID is an rCID, and a portion of the rCID is a hash of a uniform resource locator (URL) associated with content identified by the rCID.

8. A method for use in an information centric networking (ICN) network attachment point (NAP), the method comprising:
    storing, in a storage of the NAP, a database of Internet protocol (IP) addresses, a fully qualified domain name (FQDN), and corresponding ICN content identifiers (CIDs);
    receiving, from a user equipment that is not capable of ICN communication, a HTTP message;
    encapsulating the HTTP message in an ICN packet;
    publishing the ICN packet to a CID based on a hash product of the stored FQDN associated with the HTTP message;
    subscribing to a response CID (rCID) associated with the HTTP message; and
    receiving and routing at least one ICN packet associated with the rCID to the not ICN capable UE.

9. The method of claim 8, wherein the NAP is a border gateway (BGW) interfacing the ICN network and an IP network.

10. The method of claim 8, wherein the database includes, for each IP address and corresponding CID, a response CID (rCID).

11. The method of claim 8, wherein a portion of the CID is a hash of a fully qualified domain name (FQDN) of the server associated with content identified by the CID.

12. The method of claim 8, wherein the CID is an rCID, and a portion of the rCID is a hash of a uniform resource locator (URL) associated with content identified by the rCID.

* * * * *